United States Patent
Uchiyama et al.

(10) Patent No.: US 10,928,984 B2
(45) Date of Patent: Feb. 23, 2021

(54) DISPLAY DEVICE AND DISPLAY SYSTEM OF INJECTION MOLDING MACHINE

(71) Applicant: FANUC CORPORATION, Yamanashi (JP)

(72) Inventors: Tatsuhiro Uchiyama, Yamanashi (JP); Junpei Maruyama, Yamanashi (JP)

(73) Assignee: FANUC CORPORATION, Yamanashi (JP)

(*) Notice: Subject to any disclaimer, the term of this patent is extended or adjusted under 35 U.S.C. 154(b) by 0 days.

(21) Appl. No.: 16/555,994

(22) Filed: Aug. 29, 2019

(65) Prior Publication Data
US 2020/0097143 A1  Mar. 26, 2020

(30) Foreign Application Priority Data
Sep. 25, 2018 (JP) .............................. JP2018-178953

(51) Int. Cl.
*G06F 3/048* (2013.01)
*G06F 3/0482* (2013.01)
(Continued)

(52) U.S. Cl.
CPC ........ *G06F 3/0482* (2013.01); *B29C 45/1774* (2013.01); *B29C 45/76* (2013.01);
(Continued)

(58) Field of Classification Search
CPC .............................. G06F 3/0482; G06F 3/1423
See application file for complete search history.

(56) References Cited

U.S. PATENT DOCUMENTS 10,509,537 B2 * 12/2019 Yoshida .............. G06F 3/04817
2010/0208291 A1 * 8/2010 Oba .................... H04N 1/00411
358/1.15
(Continued)

FOREIGN PATENT DOCUMENTS

JP  2003-181899 A   7/2003
JP  2006-297671 A  11/2006
(Continued)

OTHER PUBLICATIONS

An Office Action mailed by the Japanese Patent Office dated Jun. 30, 2020, which corresponds to Japanese Patent Application No. 2018-178953 and is related to U.S. Appl. No. 16/555,994.
(Continued)

*Primary Examiner* — David E Choi
(74) *Attorney, Agent, or Firm* — Studebaker & Brackett PC

(57) ABSTRACT

A display device and a display system of an injection molding machine, capable of automatically displaying a window highly relevant to a window being displayed on a main screen on a sub-screen are provided.

A display device of an injection molding machine, capable of displaying two or more windows includes: a display unit having at least a main display unit and a sub-display unit; an input unit that receives an input related to selection of a window to be displayed on the display unit; and a display control unit that selectively controls the window to be displayed on the display unit based on the input to the input unit, wherein the display control unit switches a window to be displayed on the main display unit based on the input to the input unit and displays a window displayed in the past on the main display unit on the sub-display unit.

7 Claims, 13 Drawing Sheets

(51) Int. Cl.
  *G06F 3/14* (2006.01)
  *G05B 19/18* (2006.01)
  *B29C 45/76* (2006.01)
  *B29C 45/17* (2006.01)

(52) U.S. Cl.
  CPC ......... *G05B 19/182* (2013.01); *G06F 3/1423* (2013.01); *B29C 2045/7606* (2013.01); *B29C 2945/76494* (2013.01); *G05B 2219/45244* (2013.01)

(56) References Cited

U.S. PATENT DOCUMENTS

| | | | | |
|---|---|---|---|---|
| 2012/0242702 A1* | 9/2012 | Sirpal | ................... | G06F 1/1641 |
| | | | | 345/649 |
| 2013/0026956 A1* | 1/2013 | Kato | ................... | H02P 6/00 |
| | | | | 318/376 |
| 2015/0363730 A1* | 12/2015 | Crane, Jr. | ................... | G06Q 50/28 |
| | | | | 705/7.25 |
| 2017/0277398 A1* | 9/2017 | Ishibashi | ................... | G06F 3/04817 |
| 2019/0042066 A1* | 2/2019 | Kim | ................... | G06F 1/1618 |
| 2020/0097143 A1* | 3/2020 | Uchiyama | ................... | G05B 19/182 |

FOREIGN PATENT DOCUMENTS

| | | |
|---|---|---|
| JP | 2014-237290 A | 12/2014 |
| JP | 6049874 B2 | 12/2016 |
| WO | 2014-192048 A1 | 12/2014 |

OTHER PUBLICATIONS

An Office Action; "Notice of Reasons for Refusal," mailed by the Japanese Patent Office dated Sep. 15, 2020, which corresponds to Japanese Patent Application No. 2018-178953 and is related to U.S. Appl. No. 16/555,994 with English language translation.

* cited by examiner

DISPLAY DEVICE AND DISPLAY SYSTEM OF INJECTION MOLDING MACHINE

This application is based on and claims the benefit of priority from Japanese Patent Application No. 2018-178953, filed on 25 Sep. 2018, the content of which is incorporated herein by reference.

BACKGROUND OF THE INVENTION

Field of the Invention

The present invention relates to a display device and a display system of an injection molding machine.

Related Art

Conventionally, an injection molding machine is an industrial machine that injects and molds a resin or the like, for example. When an injection molding machine is operated, values related to the operation of the injection molding machine are set to the injection molding machine in advance. The injection molding machine operates based on the set values.

However, the values set to the injection molding machine are obtained by trial and error. That is, the values set to the injection molding machine are obtained by actually operating the injection molding machine using predetermined values and adjusting the values. In this case, in order to set various values, a plurality of display windows is displayed on a display device of the injection molding machine in a switching manner.

Therefore, it is desirable that the display device of the injection molding machine is configured to be able to display a plurality of windows. As a device for displaying a plurality of display windows is a switching manner in this manner, a screen display control device that includes a main screen and a sub-screen and displays a plurality of windows in a switching manner is proposed (for example, see Patent Document 1).

Patent Document 1: Japanese Unexamined Patent Application, Publication No. 2006-297671

SUMMARY OF THE INVENTION

In the screen display control device disclosed in Patent Document 1, a plurality of windows is displayed on the main screen and the sub-screen. Therefore, it is possible to improve the setting efficiency when values are set to a machine tool such as an injection molding machine, for example.

However, when values related to an operation of the injection molding machine are to be set in advance, too many windows are sometimes displayed to adjust the values. Therefore, it is more desirable that a window highly relevant to a selected main screen are displayed as a window to be displayed on a sub-screen. Moreover, it is more desirable that a window displayed on the sub-screen is automatically selected and displayed.

An object of the present invention is to provide a display device and a display system of an injection molding machine, capable of automatically displaying a window highly relevant to a window being displayed on a main screen on a sub-screen.

(1) The present invention provides a display device of an injection molding machine, capable of displaying two or more windows, including: a display unit having at least a main display unit and a sub-display unit; an input unit that receives an input related to selection of a window to be displayed on the display unit; and a display control unit that selectively controls the window to be displayed on the display unit based on the input to the input unit, wherein the display control unit switches a window to be displayed on the main display unit based on the input to the input unit and displays a window displayed in the past on the main display unit on the sub-display unit.

(2) In the display device of the injection molding machine according to (1), it is preferable that the display control unit displays a window displayed previously on the main display unit on the sub-display unit.

(3) In the display device of the injection molding machine according to (1), it is preferable that the input unit receives a switching input for switching a window to be displayed on the sub-display unit, and the display control unit switches a window to be displayed on the sub-display unit based on the switching input to the input unit.

(4) In the display device of the injection molding machine according to (1), it is preferable that the display device further includes a counting unit that counts the number of display times of a window on the main display unit, and the display control unit displays a window of which the number of display times counted by the counting unit is the largest on the sub-display unit.

(5) In the display device of the injection molding machine according to (1), it is preferable that the display device further includes a counting unit that counts the number of selection times of a window selected to be displayed on the main display unit subsequently to a window being displayed on the main display unit, and the display control unit displays a window of which the number of selection times is the largest among windows selected in the past to be displayed on the main display unit subsequently to a window being displayed on the main display unit on the sub-display unit.

(6) In the display device of the injection molding machine according to (4), it is preferable that the display control unit performs control so that a window of which the number of display times counted by the counting unit is equal to or larger than a predetermined number of times can be displayed on the sub-display unit.

(7) In the display device of the injection molding machine according to (4), it is preferable that the input unit acquires identification information for identifying an operator who operates the injection molding machine, and the display control unit controls a window to be displayed on the sub-display unit depending on an operator identified by the identification information.

(8) in the display device of the injection molding machine according to (4), it is preferable that the display device further includes an operating state determination unit that determines an operating state of the injection molding machine, the counting unit counts the number of display times of a window on the main display unit for each of the operating states, and the display control unit switches a window to be displayed on the sub-display unit depending on the operating state.

(9) The present invention provides a display system including: a plurality of the display devices according to any one of (1) to (8); and a management device connected to the plurality of display devices, wherein the management device includes: a window selection unit that selects a window to be displayed on the sub-display unit of each of the display devices based on a window displayed on the main display unit of each of the plurality of display devices, and the display control unit displays the selected window on the display device.

According to the present invention, it is possible to provide a display device and a display system of an injection molding machine, capable of automatically displaying a window highly relevant to a window being displayed on a main screen on a sub-screen.

DETAILED DESCRIPTION OF THE INVENTION

Hereinafter, a display device 1 and a display system of an injection molding machine 100 according to embodiments of the present invention will be described with reference to FIGS. 1 to 4. First, an outline of the injection molding machine 100 and the display device 1 of the injection molding machine 100 will be described.

The injection molding machine 100 is a machine that injects a resin melted at a high temperature into a mold and cooling the resin to manufacture a product (a molded product), for example. When a product is manufactured using the injection molding machine 100, the injection molding machine 100 can manufacture a product in a more appropriate state by operating based on values (setting values) set in advance.

The setting values are adjusted and determined by actually operating the injection molding machine 100 preliminarily before mass production of products starts. The adjustment and determination of the setting values are performed based on the input of values to the injection molding machine 100 and the input of determination of setting from an operator M who controls the injection molding machine 100, for example. When the setting values are input and determined, the display device 1 of the injection molding machine 100 receives the input of adjustment of the setting values from the operator M by sequentially displaying a plurality of windows indicating the state of the injection molding machine 100 according to the selection input from the operator M. Moreover, the display device 1 of the injection molding machine 100 receives the input of determination of the setting values from the operator M. In this way, the display device 1 and the display system of the injection molding machine 100 according to the embodiments of the present invention can assist the operator M in adjusting and determining the setting values.

First Embodiment

Figure 1:
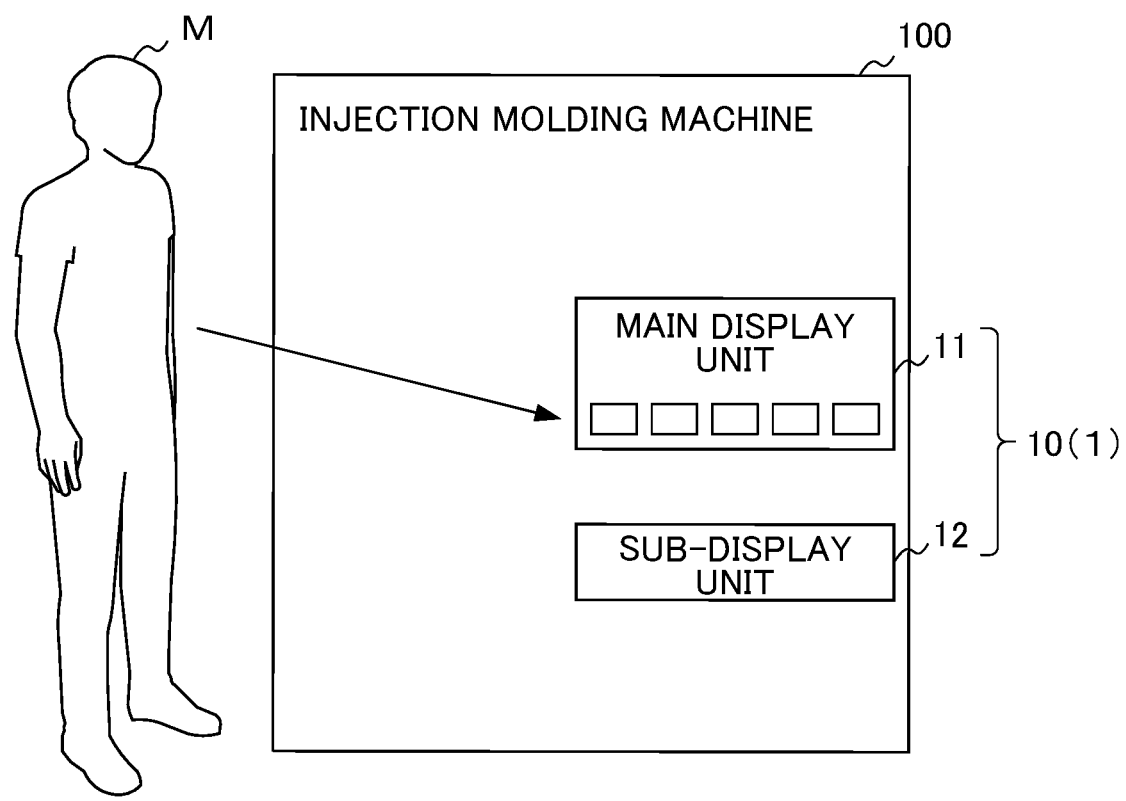
FIG. 1 is a schematic block diagram illustrating an injection molding machine according to a first embodiment of the present invention.
Figure 2:
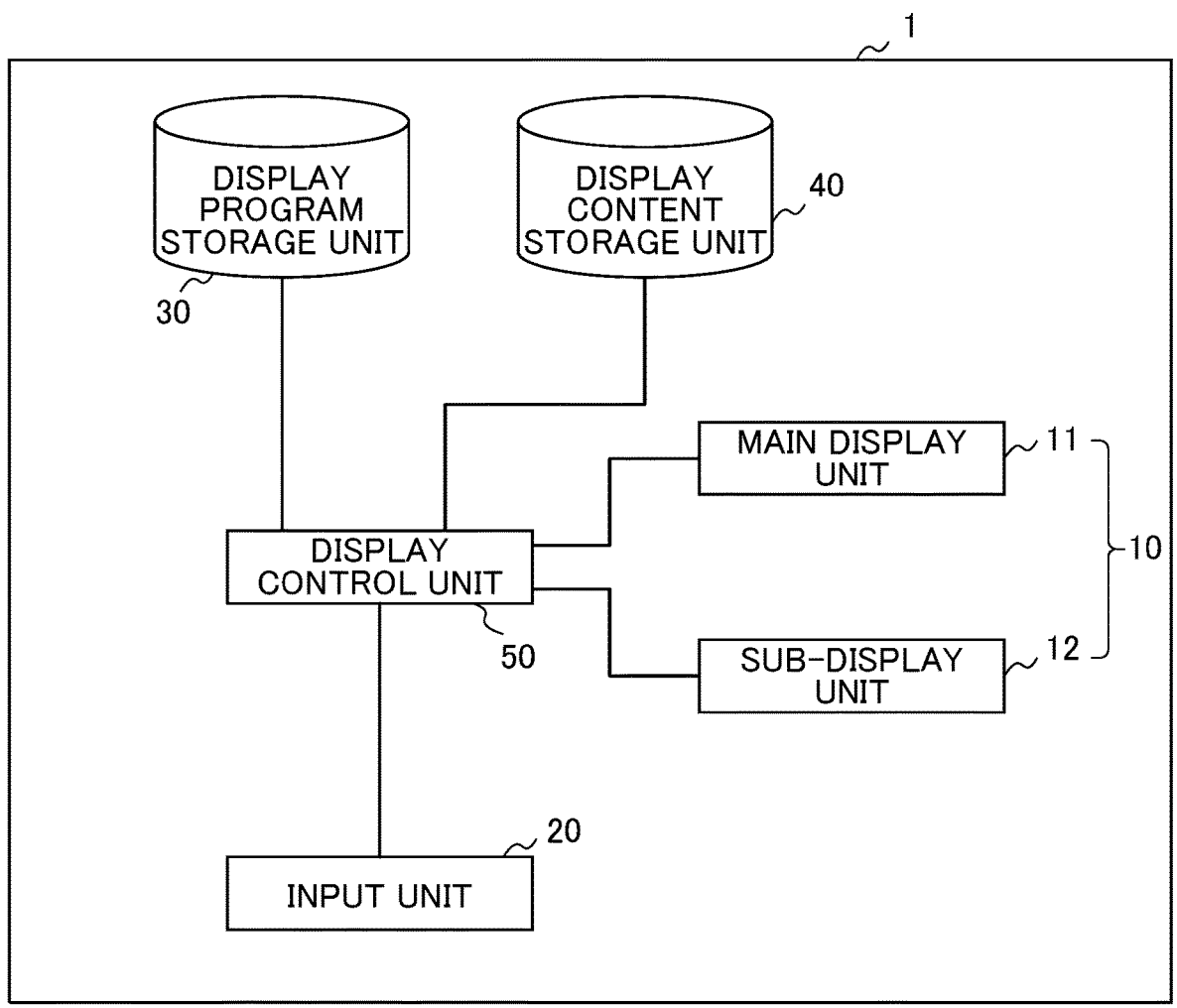
FIG. 2 is a block diagram illustrating a display device of the injection molding machine according to the first embodiment.

Next, the display device 1 of the injection molding machine 100 according to a first embodiment of the present invention will be described with reference to FIGS. 1 to 4. The display device 1 of the injection molding machine 100 according to the present embodiment is a device capable of displaying two or more windows. As illustrated in FIG. 1, the display device 1 of the injection molding machine 100 is configured to be integrated with the injection molding machine 100, for example. The display device 1 of the injection molding machine 100 displays an operating state, setting values, and the like of the injection molding machine 100 to the operator 14 of the injection molding machine 100 using a plurality of windows. As illustrated in FIG. 2, the display device 1 of the injection molding machine 100 includes a display program storage unit 30, a display content storage unit 40, a plurality of display units 10, an input unit 20 (a selection input unit 21), and a display control unit 50. In the present embodiment, "window" means an image displayed on the display device 1.

The display program storage unit 30 is an auxiliary storage medium such as a hard disk or a memory, for example. The display program storage unit 30 stores a plurality of programs for displaying windows for each window.

Figure 3:
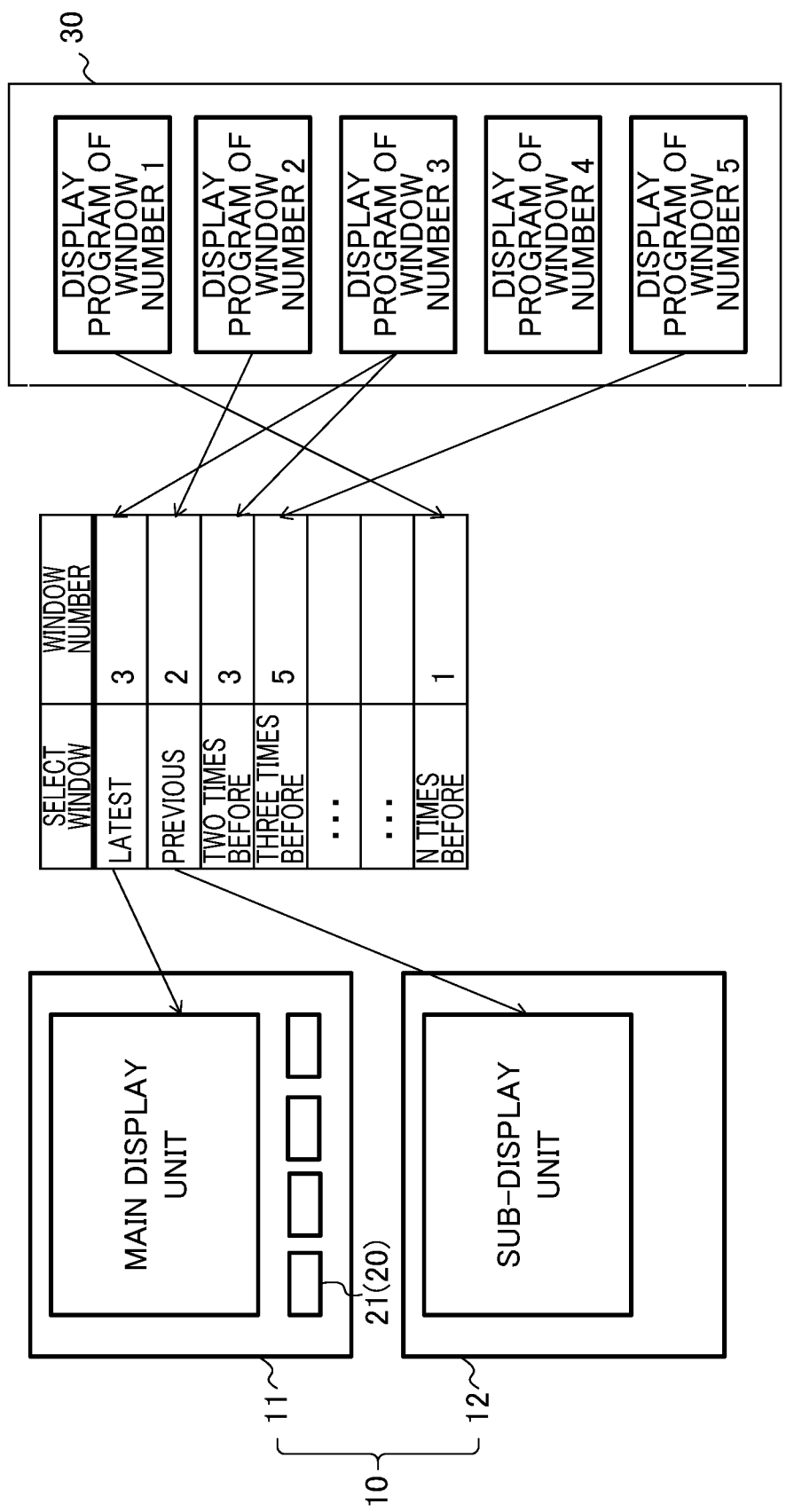
FIG. 3 is a conceptual diagram illustrating a display mode of the display device of the injection molding machine according to the first embodiment.

The display content storage unit 40 is an auxiliary storage medium such as a hard disk or a memory, for example, and the display content storage unit 40 stores a display order of displayed windows as data. As illustrated in FIG. 3, for example, the display content storage unit 40 stores data arranged in an order (selection order) in which window numbers (identification numbers of windows) are selected by the operator M.

The display unit 10 is a display or a liquid-crystal device, for example. For example, in the present embodiment, a plurality of display units 10 are provided. The plurality of display units 10 includes at least a main display unit 11 and a sub-display unit 12. Specifically, the plurality of display units 10 includes one main display unit 11 and one sub-display unit 12 as an example.

The main display unit 11 is a device that displays a window selected recently by the operator M, for example.

Specifically, the main display unit 11 is a device that displays a window selected recently by the operator N among a plurality of windows.

The sub-display unit 12 is a device that displays windows displayed in the past on the main display unit 11, for example. The sub-display unit 12 is a device that displays windows displayed in the past on the main display unit 11.

The input unit 20 is an input device that receives an input, for example. The input unit 20 receives the input related to selection of a window to be displayed on the display unit 10. Specifically, the input unit 20 receives the input related to selection of a window to be displayed on the display unit 10 from the operator M of the injection molding machine 100. In the present embodiment, the input unit 20 is configured as a position detection device (a touch pad) disposed in the main display unit 11, for example. Moreover, in the present embodiment, the input unit 20 receives the input related to selection of a window to be displayed on the main display unit 11. Specifically, the input unit 20 receives the input related to selection of a window to be displayed on the main display unit 11 from the operator 14 of the injection molding machine 100. In the following description, the input unit 20 that receives the input of selecting a window to be displayed on the main display unit 11 is also referred to as a "selection input unit 21".

The display control unit 50 is realized when an arithmetic device such as a processor (not illustrated), for example, operates. The display control unit 50 selectively controls a window to be displayed on the display unit 10 based on the input to the input unit 20. The display control unit 50 reads a display program corresponding to a window selected by the input unit 20 from a display program. The display control unit 50 displays a window drawn by the read display program on the main display unit 11. Moreover, the display control unit 50 stores data arranged in a selection order of identifying the windows displayed presently on the main display unit 11 as latest windows in the display content storage unit 40.

Moreover, the display control unit 50 switches a window to be displayed on the main display unit 11 based on the input to the input unit 20 (the selection input unit 21). Specifically, the display control unit 50 reads a display program corresponding to a window newly selected by the input unit 20. The display control unit 50 performs switching so that a window drawn by the read display program is displayed on the main display unit 11. The display control unit 50 displays windows displayed in the past on the main display unit 11 on the sub-display unit 12. In the present embodiment, as illustrated in FIG. 3, the display control unit 50 displays a window displayed previously on the main display unit 11 on the sub-display unit 12. That is, the display control unit 50 displays a window displayed on the main display unit 11 before switching on the sub-display unit 12. Specifically, the display control unit 50 reads data arranged in the selection order stored in the display content storage unit 40 and reads a display program of the window displayed previously on the main display unit 11 from the display program storage unit 30. The display control unit 50 draws a window on the sub-display unit 12 using the read display program. For example, in the present embodiment, the display control unit 50 displays a window of window number 3 on the main display unit 11. Moreover, the display control unit 50 displays a window of window number 2 displayed previously on the main display unit 11 on the sub-display unit 12.

Figure 4:
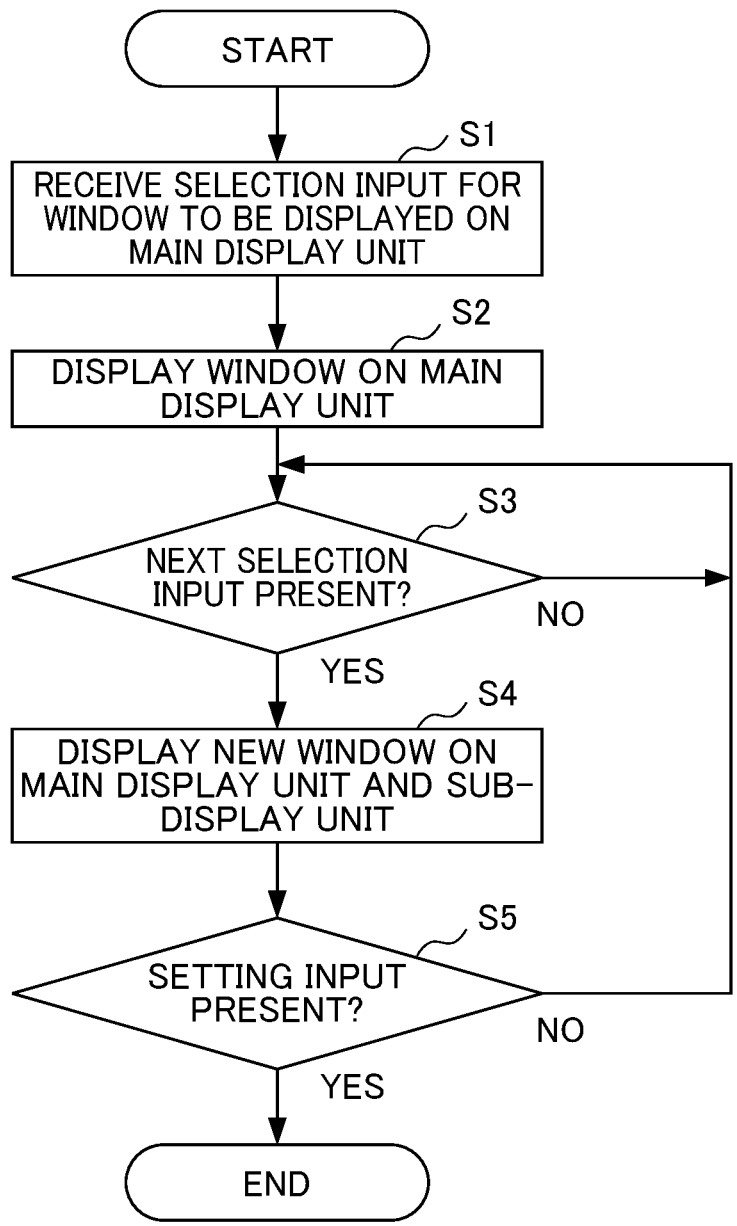
FIG. 4 is a flowchart illustrating the flow of processes of the display device of the injection molding machine according to the first embodiment.

Next, the operation of the display device 1 of the injection molding machine 100 according to the present embodiment will be described with reference to the flowchart of FIG. 4. First, the input unit 20 (the selection input unit 21) receives a selection input of a window to be displayed on the main display unit 11 from the operator M (step S1). Subsequently, the display control unit 50 reads a display program corresponding to the selected window from the display program storage unit 30 and displays the selected window on the main display unit 11 (step S2). Moreover, the display control unit 50 updates data by adding identification information of a window displayed on the main display unit 11 to data arranged in a selection order as information on the latest window. The display control unit 50 stores the updated data in the display content storage unit 40.

Subsequently, the display control unit 50 determines whether a selection input of the next window is present via the input unit 20 (the selection input unit 21) (step S3). When the selection input of the next window is present, the flow proceeds to step S4. When the selection input of the next window is not present, the display control unit 50 waits as it is.

In step S4, the display control unit 50 reads a display program corresponding to the selected window from the display program storage unit 30. The display control unit 50 displays the window on the main display unit 11 using the read display program. The display control unit 50 reads data arranged in the selection order from the display content storage unit 40 and updates the data by adding information of identifying the window displayed presently to the data arranged in the selection order as the latest window. The display control unit 50 stores the updated data in the display content storage unit 40. Moreover, the display control unit 50 reads a display program from the display program storage unit 30 based on the information on the latest window included in the read data arranged in the selection order. The display control unit 50 displays a window drawn using the read display program on the sub-display unit 12.

Subsequently, in step S5, the display control unit 50 determines whether an input for setting a setting value is present via the input unit 20. When the input for setting the setting value is present, the display control unit 50 ends the process. On the other hand, when the input for setting the setting value is not present, the flow returns to step S3.

According to the display device 1 of the injection molding machine 100, the following advantages are obtained.

(1) The display device 1 of the injection molding machine 100, capable of displaying two or more windows includes the display unit 10 having at least the main display unit 11 and the sub-display unit 12, the input unit 20 that receives the input related to selection of a window to be displayed on the display unit 10, and the display control unit 50 that selectively controls a window to be displayed on the display unit 10 based on the input to the input unit 20, wherein the display control unit 50 switches a window to be displayed on the main display unit 11 based on the input to the input unit 20 and displays a window displayed in the past on the main display unit 11 on the sub-display unit 12.

In this way, when it is selected such that a new window is to be displayed on the main display unit 11, the window displayed in the past on the main display unit 11 is displayed on the sub-display unit 12. Therefore, since the operator M can input values and the like to the main display unit 11 while referring to the sub-display unit 12, it is possible to improve the operation efficiency when adjusting the injection molding machine 100 in advance. Particularly, since the window displayed in the past on the main display unit 11 is displayed on the sub-display unit 12, it is possible to display a window considered to be highly relevant to the main display unit 11 on the sub-display unit 12 and to further improve the operation efficiency.

(2) The display control unit 50 displays a window displayed previously on the main display unit 11 on the sub-display unit 12. In this way, it is possible to move the window being already displayed on the main display unit 11 automatically to the sub-display unit 12 and to display the next window on the main display unit 11. Therefore, since the operator M can input setting values to the injection molding machine 100 while referring to a previous window, it is possible to improve the operation efficiency.

Second Embodiment

Figure 6:
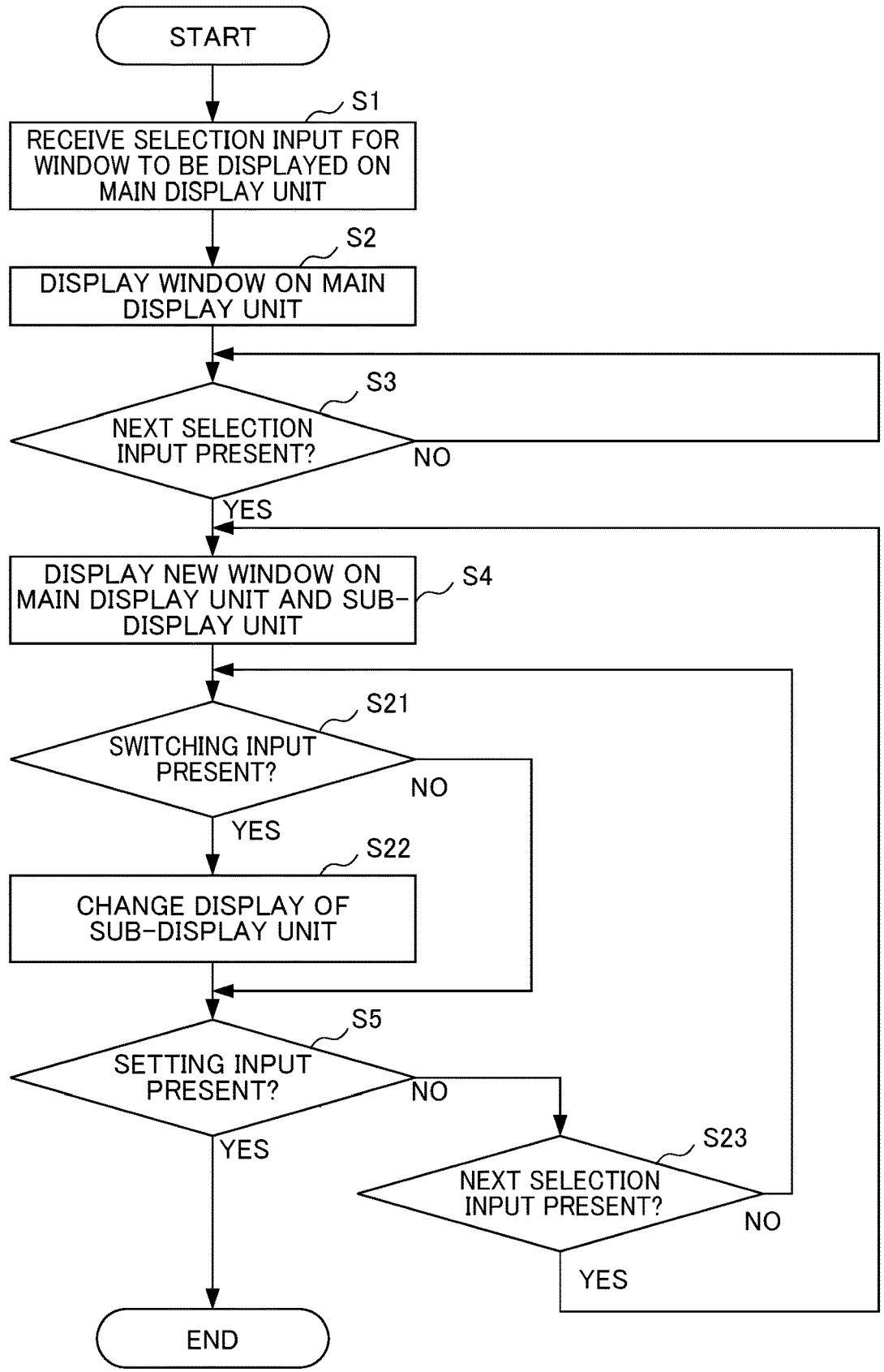
FIG. 6 is a flowchart illustrating the flow of processes of the display device of the injection molding machine according to the second embodiment.
Figure 7:
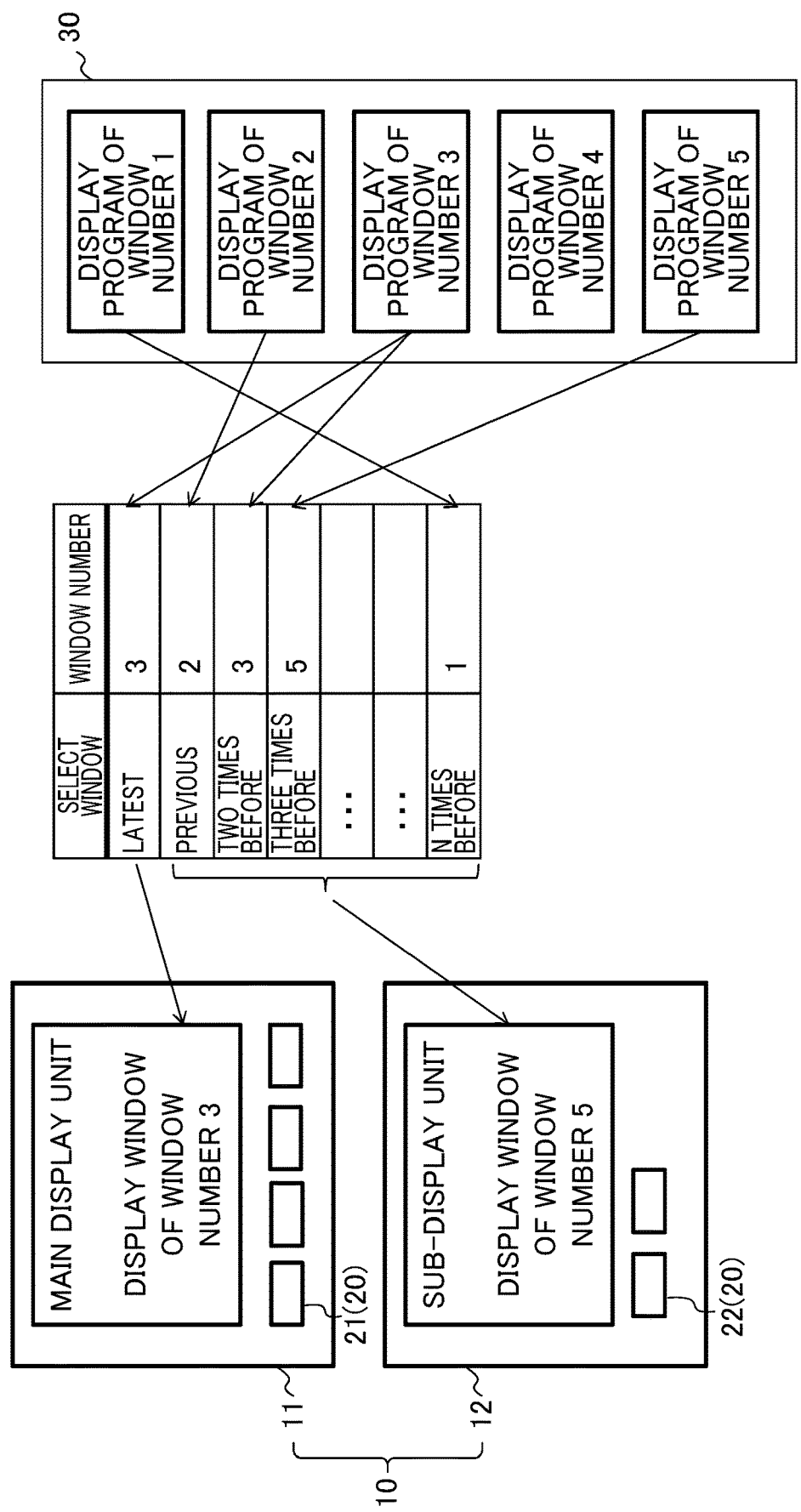
FIG. 7 is a conceptual diagram illustrating a display mode of the display device of the injection molding machine according to the second embodiment.

Next, the display device 1 of the injection molding machine 100 according to a second embodiment of the present invention will be described with reference to FIGS. 5 to 7. In description of the second embodiment, the same constituent elements as those of the above-described embodiment will be denoted by the same reference numerals and the description thereof will be omitted or simplified. The display device 1 of the injection molding machine 100 according to the second embodiment is different from that of the first embodiment in that the input unit 20 receives a switching input for switching a window to be displayed on the sub-display unit 12. Moreover, the display device 1 of the injection molding machine 100 according to the second embodiment is different from that of the first embodiment in that the display control unit 50 switches a window displayed on the sub-display unit 12 based on the switching input to the input unit 20. Furthermore, the operation of the display device 1 of the injection molding machine 100 according to the second embodiment is different from that of the first embodiment in that steps S21 and S22 are added between steps S4 and S5. Furthermore, the operation of the display device 1 of the injection molding machine 100 according to the second embodiment is different from that of the first embodiment in that the flow proceeds to step S23 when the input for setting the setting value is not present in step S5.

Figure 5:
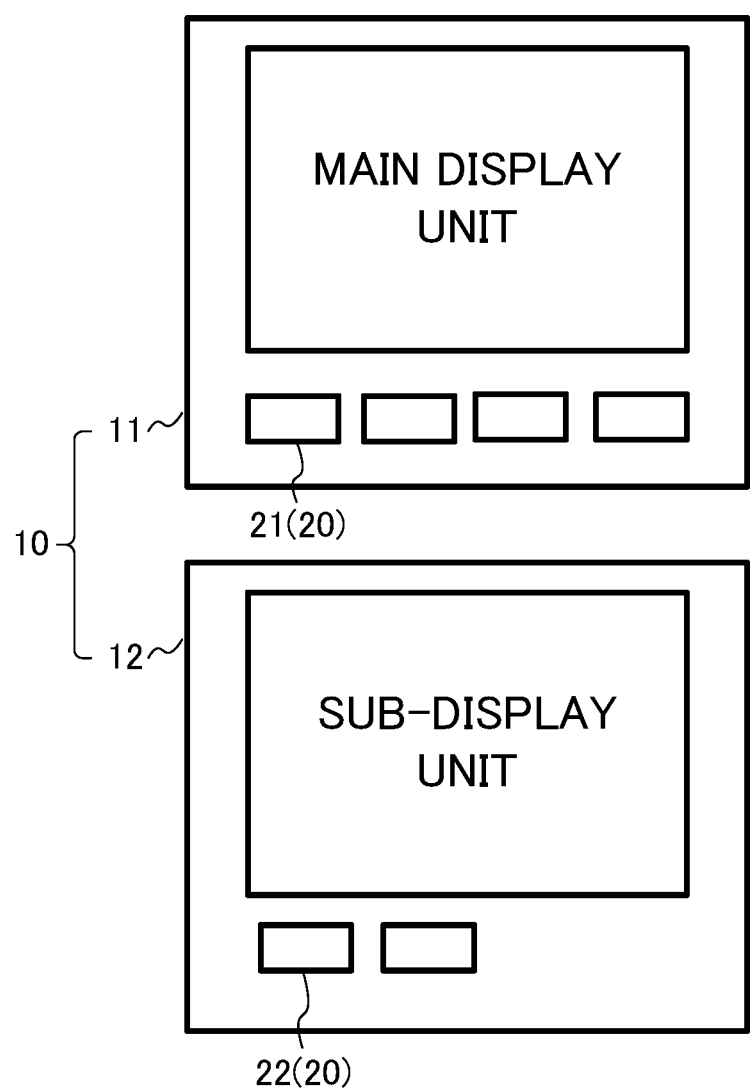
FIG. 5 is a schematic diagram illustrating a display mode of a display device of an injection molding machine according to a second embodiment of the present invention.

The input unit 20 may be configured as a position detection device (a touch pad) disposed in the sub-display unit 12 as illustrated in FIG. 5, for example, as well as the main display unit 11. The input unit 20 is configured to be able to receive the input for switching a window to be displayed on the sub-display unit 12. Specifically, the input unit 20 includes the selection input unit 21 that selects a window to be displayed on the main display unit 11 and a switching unit 22 that switches a window to be displayed on the sub-display unit 12.

Next, the operation of the display device 1 of the injection molding machine 100 according to the present embodiment will be described with reference to the flowchart of FIG. 6. In step S21, the display control unit 50 determines whether a switching input for switching a window to be displayed on the sub-display unit 12 is received. When the input is received, the flow proceeds to step S22. On the other hand, when the input is not present, the flow proceeds to step S5.

In step S22 subsequent to step S4, the display control unit 50 reads data arranged in a selection order from the display content storage unit 40. The display control unit 50 reads a display program related to a window to be displayed on the sub-display unit 12 based on the content input to the input unit 20 (the switching unit 22) and displays a window on the sub-display unit 12. When a display input for tracing windows backward is received from the input unit 20 (the switching unit 22), for example, the display control unit 50 traces back to the past data by referring to the data arranged in the selection order and displays a window displayed in the past on the main display unit 11 on the sub-display unit 12. Moreover, when a display input for tracking windows forward is received from the input unit 20 (the switching unit 22), for example, the display control unit 50 displays a window displayed more recently on the main display unit 11 on the sub-display unit 12 by referring to the data arranged in the selection order. Specifically, when a display input for tracing windows backward is received from the input unit 20 (the switching unit 22), for example, the display control unit 50 displays a window displayed (N+1) times before on the main display unit 11 from a window (a window being displayed presently on the sub-display unit 12) displayed N times before on the main display unit 11 on the sub-display unit 12.

On the other hand, when a display input for tracing windows forward is received from the input unit 20 (the switching unit 22), for example, the display control unit 50 displays a window displayed (N+1) times before from a window (a window being displayed presently on the sub-display unit 12) displayed N times before on the main display unit 11 on the sub-display unit 12. For example, as illustrated in FIG. 7, when a window displayed three times before on the main display unit 11 is selected using the input unit 20 (the switching unit 22), the display control unit 50 displays a window of window number 5 on the sub-display unit 12. Subsequently, the flow proceeds to step S5.

Subsequently, in step S5, the display control unit 50 determines whether an input for setting a setting value is present via the input unit 20. When the input for setting the setting value is present, the display control unit 50 ends the process. On the other hand, when the input for setting the setting value is not present, the flow returns to step S23.

In step S23, the display control unit 50 determines whether a selection input for a windows to be displayed subsequently on the main display unit 11 is present via the input unit 20. When a selection input for a window to be displayed subsequently on the main display unit 11 is present, the flow proceeds to step S4. When a selection input for the next window is not present, the flows proceeds to step S21.

According to the display device 1 of the injection molding machine 100, the following advantages are obtained.

(3) The input unit 20 receives a switching input for switching a window to be displayed on the sub-display unit 12, and the display control unit 50 switches a window to be displayed on the sub-display unit 12 based on the switching input to the input unit 20 in this way, the operator 14 can switch a window to be displayed on the sub-display unit 12 arbitrarily. Therefore, since an appropriate window can be displayed on the sub-display unit 12 without switching a window being displayed on the main display unit 11, it is possible to further improve the operation efficiency when adjusting the injection molding machine 100 in advance.

Third Embodiment

Figure 8:
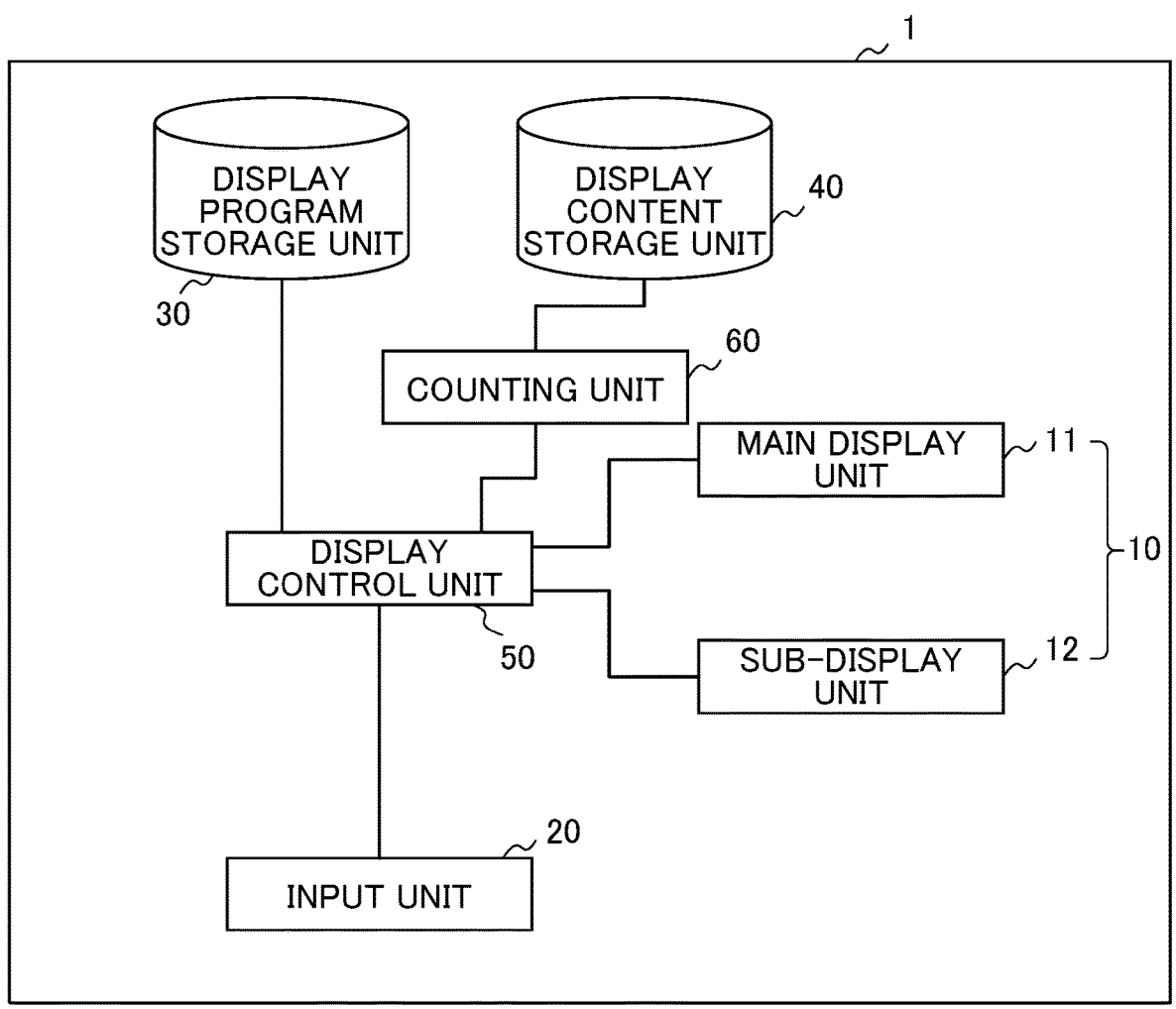
FIG. 8 is a block diagram illustrating a display device of an injection molding machine according to a third embodiment of the present invention.
Figure 9:
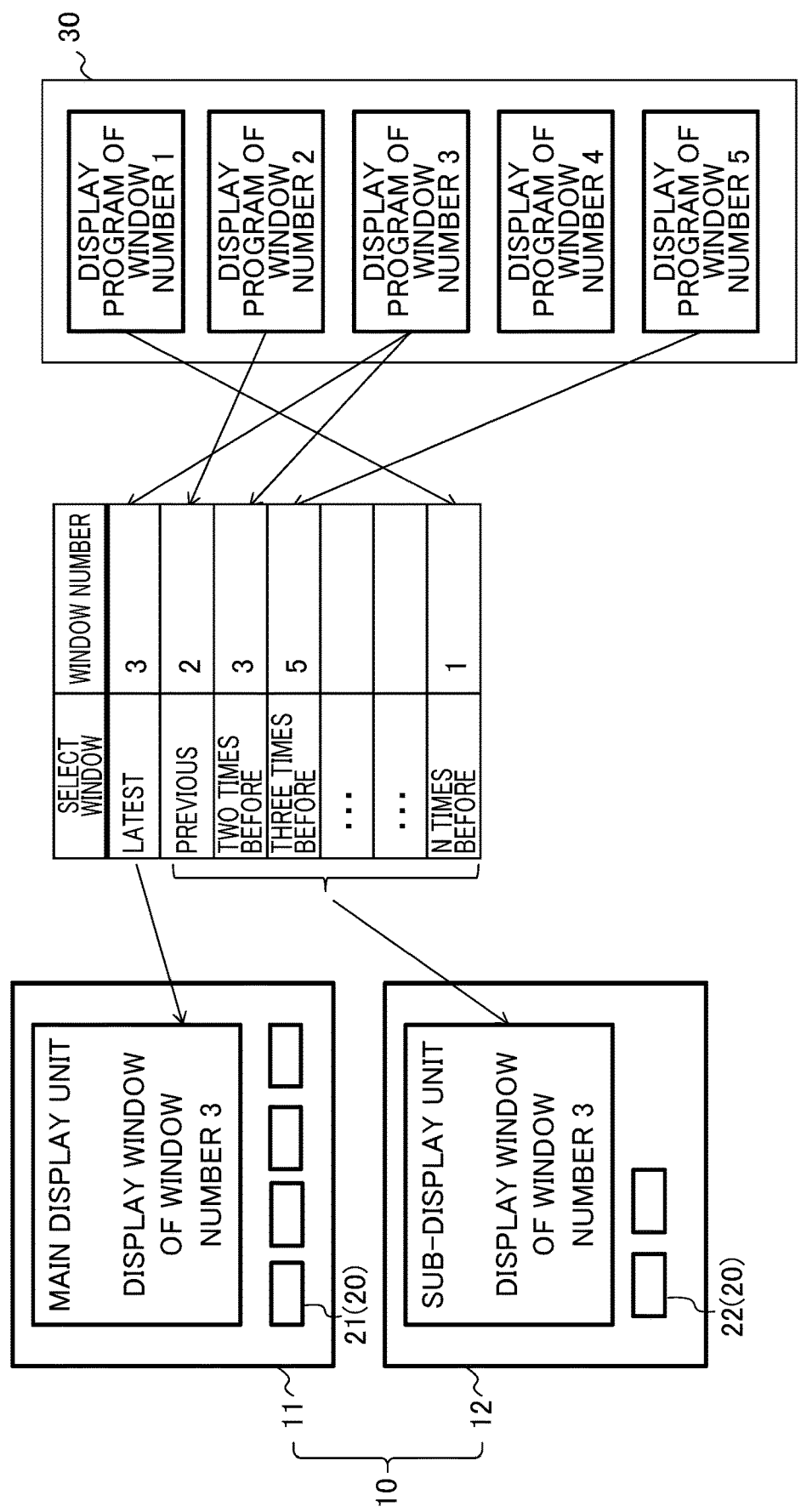
FIG. 9 is a conceptual diagram illustrating a display mode of the display device of the injection molding machine according to the third embodiment.

Next, the display device 1 of the injection molding machine 100 according to a third embodiment of the present invention will be described with reference to FIGS. 8 and 9. In description of the third embodiment, the same constituent elements as those of the above-described embodiments will be denoted by the same reference numerals and the description thereof will be omitted or simplified. As illustrated in FIG. 8, the display device 1 of the injection molding machine 100 according to the third embodiment is different from that of the first and second embodiments in that the display device 1 further includes a counting unit 60. Moreover, the display device 1 of the injection molding machine 100 according to the third embodiment is different from that of the first and second embodiments in that the display control unit 50 displays a window of which the number of display times counted by the counting unit 60 is the largest on the sub-display unit 12 instead of displaying a window displayed previously on the main display unit 11. For example, as illustrated in FIG. 9, the display control unit 50 displays a window of window number 3 of which the number of display times the window was displayed on the main display unit 11 is the largest on the sub-display unit 12.

The counting unit 60 counts the number of display times of a window displayed on the main display unit 11. Specifically, the counting unit 60 counts the number of display times of a window displayed on the main display unit 11 based on the data arranged in the selection order, for example.

According to the display device 1 of the injection molding machine 100, the following advantages are obtained.

(4) The display device 1 of the injection molding machine 100 further includes the counting unit 60 that counts the number of display times of a window displayed on the main display unit 11, and the display control unit 50 displays a window of which the number of display times counted by the counting unit 60 is the largest on the sub-display unit 12. In this way, since a window of which the number of display times on the main display unit 11 is the largest is automatically displayed on the sub-display unit 12, it is possible to display a window which the use frequency is considered to be high on the sub-display unit 12. Therefore, it is possible to further improve the operation efficiency.

Fourth Embodiment

Next, the display device 1 of the injection molding machine 100 according to a fourth embodiment of the present invention will be described. In description of the fourth embodiment, the same constituent elements as those of the above-described embodiments will be denoted by the same reference numerals and the description thereof will be omitted or simplified. The display device of the injection molding machine 100 according to the fourth embodiment is different from that of the first and second embodiment in that the display device 1 further include the counting unit 60. Moreover, the display device 1 of the injection molding machine 100 according to the fourth embodiment is different from that of the first and second embodiments in that the display control unit 50 displays a window of which the number of selection times is the largest among the windows selected in the past to be displayed on the main display unit 11 subsequently to the window displayed on the main display unit 11 on the sub-display unit 12 rather than displaying a window displayed previously on the main display unit 11 on the sub-display unit 12.

The counting unit 60 counts the number of selection times of a window selected to be displayed on the main display unit 11. Specifically, the counting unit 60 counts the number of selection times of a window selected to be displayed on the main display unit 11 subsequently to a window displayed on the main display unit 11, for example. The counting unit 60 reads data arranged in the selection order from the display content storage unit 40 and counts the number of windows selected subsequently to the window being displayed on the main display unit 11 and the number of selection times thereof.

According to the display device 1 of the injection molding machine 100, the following advantages are obtained.

(5) The display device 1 of the injection molding machine 100 further includes the counting unit 60 that counts the number of selection times of a window selected to be displayed on the main display unit 11 subsequently to a window being displayed on the main display unit 11, and the display control unit 50 displays a window of which the number of selection times the window was selected in the past to be displayed on the main display unit 11 subsequently to the window being displayed on the main display unit 11 on the sub-display unit 12. In this way, since a window of which the number of display times the window was subsequently displayed on the main display unit 11 is the largest is first displayed on the sub-display unit 12 based on past statistics, it is not necessary to select the next window on the main display unit 11 and display the same. Therefore, it is possible to further improve the operation efficiency.

Fifth Embodiment

Next, the display device 1 of the injection molding machine 100 according to a fifth embodiment of the present invention will be described. In description of the fifth embodiment, the same constituent elements as those of the above-described embodiments will be denoted by the same reference numerals and the description thereof will be omitted or simplified. The display device 1 of the injection molding machine 100 according to the fifth embodiment is different from that of the third embodiment in that the display control unit 50 performs control so that a window of which the number of times counted by the counting unit 60 is equal to or larger than a predetermined number of times can be displayed on the sub-display unit 12.

According to the display device 1 of the injection molding machine 100, the following advantages are obtained.

(6) The display control unit 50 performs control so that a window of which the number of times counted by the counting unit 60 is equal to or larger than a predetermined number of times can be displayed on the sub-display unit 12. In this way, when the number of display times of a window on the main display unit 11 is smaller than the predetermined number of times, it is possible to automatically prevent the window from being displayed on the sub-display unit 12. Therefore, it is possible to suppress a window considered to be little relevant to the main display unit 11 from being displayed on the sub-display unit 12 and to further improve the operation efficiency.

Sixth Embodiment

Next, the display device 1 of the injection molding machine 100 according to a sixth embodiment of the present invention will be described. In description of the sixth embodiment, the same constituent elements as those of the above-described embodiments will be denoted by the same reference numerals and the description thereof will be omitted or simplified. The display device 1 of the injection molding machine 100 according to the sixth embodiment is different from that of the third to fifth embodiments in that the input unit 20 acquires identification information for identifying the operator M who operates the injection molding machine 100. Moreover, the display device 1 of the injection molding machine 100 according to the sixth embodiment is different from that of the third to fifth embodiments in that the display control unit 50 controls a window to be displayed on the sub-display unit 12 for each of the operators M identified by the identification information. Furthermore, the display device 1 of the injection molding machine 100 according to the sixth embodiment is different from that of the third to fifth embodiments in that the display content storage unit 40 stores data arranged in the selection order for each of the operators M identified by the identification information.

According to the display device 1 of the injection molding machine 100, the following advantages are obtained.

(7) The input unit 20 acquires the identification information for identifying the operator M who operates the injection molding machine 100, and the display control unit 50 controls a window to be displayed on the sub-display unit 12 for each of the operators M identified by the identification information. In this way, a different window is displayed on the sub-display unit 12 depending on the operator M. Therefore, since it is possible to provide the display device 1 that is user-friendly based on the know-how or the like of the operator M, it is possible to further improve the operation efficiency.

Seventh Embodiment

Figure 10:
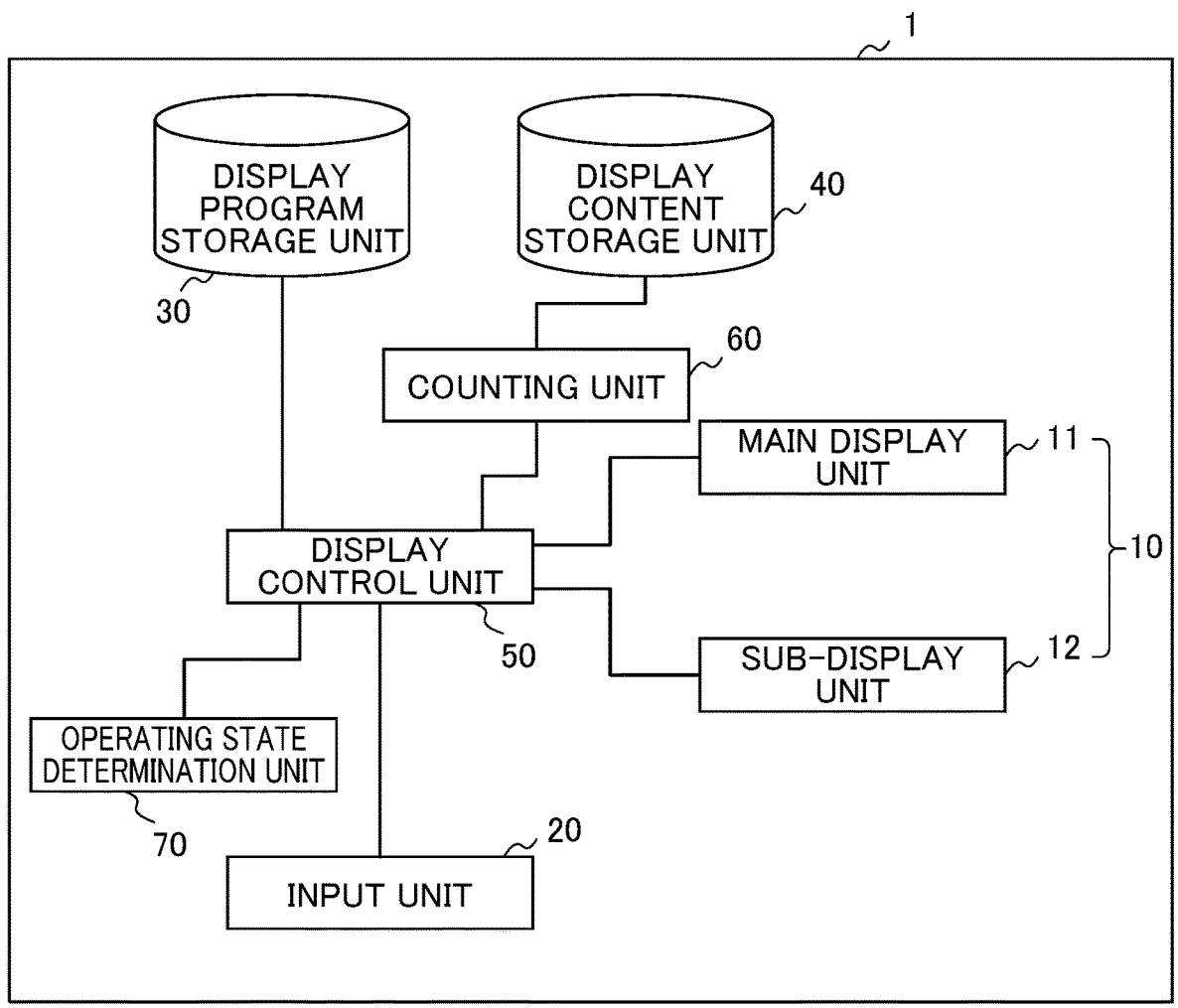
FIG. 10 is a block diagram illustrating a display device of an injection molding machine according to a seventh embodiment of the present invention.

Next, the display device 1 of the injection molding machine 100 according to a seventh embodiment of the present invention will be described with reference to FIG. 10. In description of the seventh embodiment, the same constituent elements as those of the above-described embodiments will be denoted by the same reference numerals and the description thereof will be omitted or simplified. The display device 1 of the injection molding machine 100 according to the seventh embodiment is different from that of the third to sixth embodiments in that the display device 1 further includes an operating state determination unit 70. The display device 1 of the injection molding machine 100 according to the seventh embodiment is different from that of the third to sixth embodiments in that the counting unit 60 counts the number of display times of a window on the main display unit 11 for each operating state. The display device 1 of the injection molding machine 100 according to the seventh embodiment is different from that of the third to sixth embodiments in that the display control unit 50 switches a window to be displayed on the sub-display unit 12 depending on an operating state. The display device 1 of the injection molding machine 100 according to the seventh embodiment is different from that of the third to sixth embodiments in that the display content storage unit 40 stores data arranged in the selection order for each operating state.

The operating state determination unit 70 determines an operating state of the injection molding machine 100. For example, the operating state determination unit 70 determines whether the injection molding machine 100 is in an operating state of a molding preparation state, a molding condition adjustment state, a molding operation state, or a molding ending state.

According to the display device 1 of the injection molding machine 100, the following advantages are obtained.

(8) The display device 1 of the injection molding machine 100 further includes the operating state determination unit 70 that determines an operating state of the injection molding machine 100, the counting unit 60 counts the number of display times of a window on the main display unit 11 for each operating state, and the display control unit 50 switches a window to be displayed on the sub-display unit 12 depending on the operating state. In this way, since a window to be displayed on the sub-display unit 12 can be switched depending on the operating state of the injection molding machine 100, it is possible to display a highly relevant window on the sub-display unit 12 depending on the operating state of the injection molding machine 100 in a test running state. Therefore, it is possible to further improve the operation efficiency.

Eighth Embodiment

Figure 11:
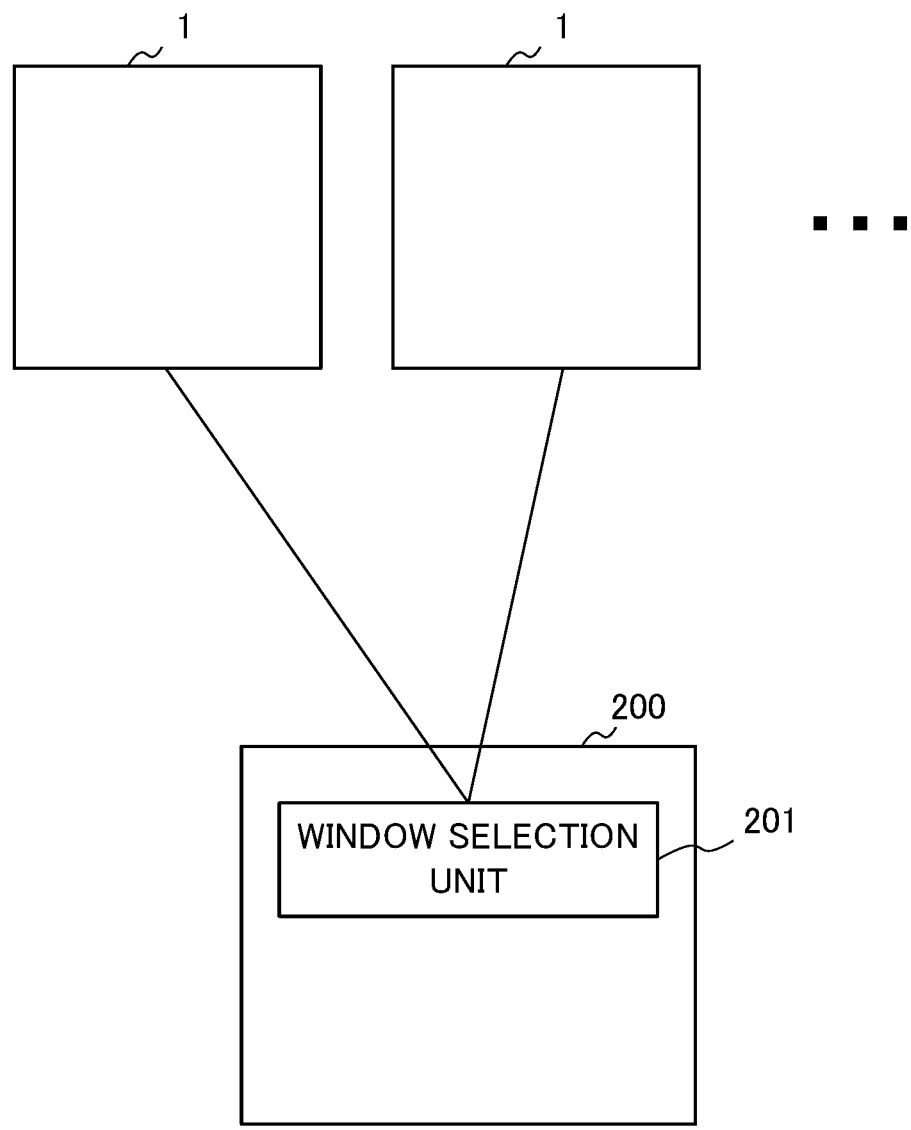
FIG. 11 is a schematic diagram illustrating a display system of an injection molding machine according to an eighth embodiment of the present invention.

Next, a display system 2 of the injection molding machine 100 according to an eighth embodiment of the present invention will be described with reference to FIG. 11. In description of the eighth embodiment, the same constituent elements as those of the above-described embodiments will be denoted by the same reference numerals and the description thereof will be omitted or simplified. The display system 2 of the injection molding machine 100 according to the eighth embodiment includes a plurality of display devices 1 according to any one of the first to seventh embodiments and a management device 200.

The management device 200 is a server, for example, and is connected to the plurality of display devices 1 via a network. The management device 200 includes a window selection unit 201 that selects a window to be displayed on the sub-display unit 12 of each of the display devices 1 based on a window displayed on the main display unit 11 of each of the plurality of display devices 1. The window selection unit 201 operates similarly to the display control unit 50 of the first to seventh embodiments based on the window displayed on the main display unit 11 of each of the plurality of display devices 1. The display control unit 50 of the present embodiment displays a window selected by the window selection unit 201 on the display device 1.

According to the display system 2 of the injection molding machine 100, the following advantages are obtained.

(9) The display system 2 of the injection molding machine 100 includes the plurality of display devices 1 according to any one of (1) to (8) and the management device 200 connected to the plurality of display devices 1, the management device 200 includes the window selection unit 201 that selects a window to be displayed on the sub-display unit 12 of each of the display devices 1 based on a window displayed on the main display unit 11 of each of the plurality of display devices 1, and the display control unit 50 displays the selected window on the display device 1. In this way, since the display devices 1 of the injection molding machines 100 can be managed by the management device 200 in an integrated manner, it is possible to select a window to be displayed on the sub-display unit 12 based on more information. Therefore, it is possible to display a window more appropriate to the setting on the sub-display unit 12 and to further improve the operation efficiency.

While preferred embodiments of the display device of the injection molding machine of the present invention have been described, the present invention is not limited to the above-described embodiments but may be changed appropriately.

For example, in the respective embodiments, although it is assumed that there are a plurality of display units 10, there is no limitation thereto. Only one display unit 10 may be provided. In this case, the main display unit 11 and the sub-display unit 12 each may be provided one of the divided display regions of one display window.

Moreover, in the first embodiment, although the display control unit 50 reads the data arranged in the selection order stored in the display content storage unit 40, there is no limitation thereto. For example, the display control unit 50 may move a window being displayed on the main display unit 11 to the sub-display unit 12 instead of reading the data arranged in the selection order.

Moreover, in the third embodiment, although the display control unit 50 displays a window of which the number of times counted by the counting unit 60 is the largest on the sub-display unit 12, there is no limitation thereto. The display control unit 50 may display a window of which the number of times is the next highest on the sub-display unit 12 when a window of which the number of times is the largest is already displayed on the main display unit 11.

Moreover, in the fifth embodiment, when the number of display times of any window on the main display unit 11 does not exceed the predetermined number of times, a window to be displayed on the sub-display unit 12 may be selected using any one of the methods of the first to seventh embodiments.

Figure 12:
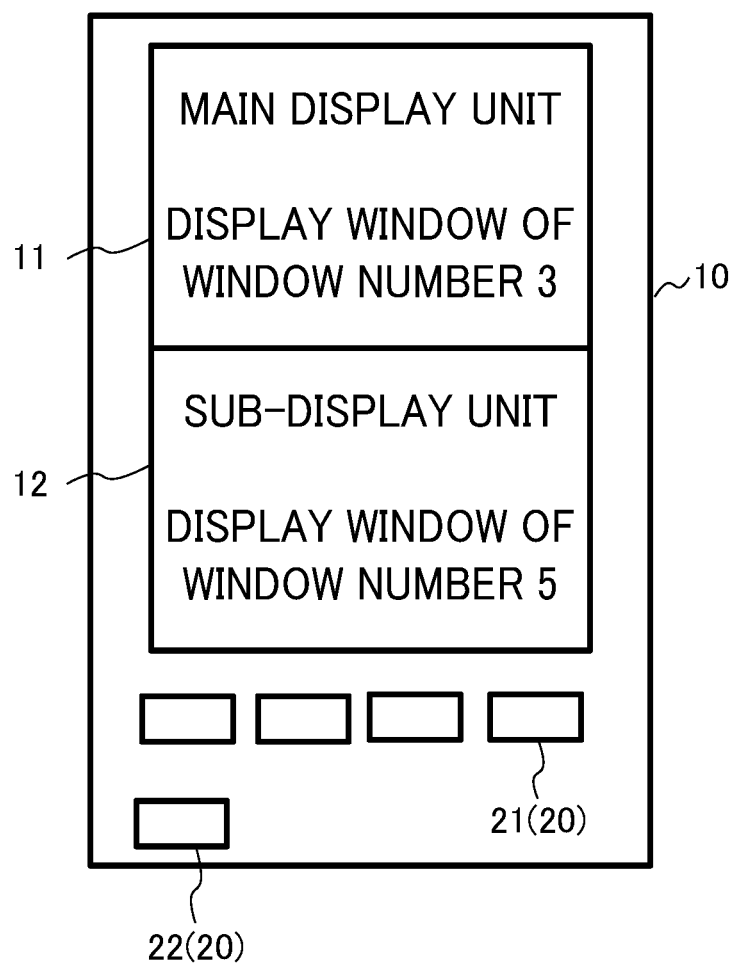
FIG. 12 is a conceptual diagram illustrating a display mode of a display device of an injection molding machine according to a modification of the present invention.
Figure 13:
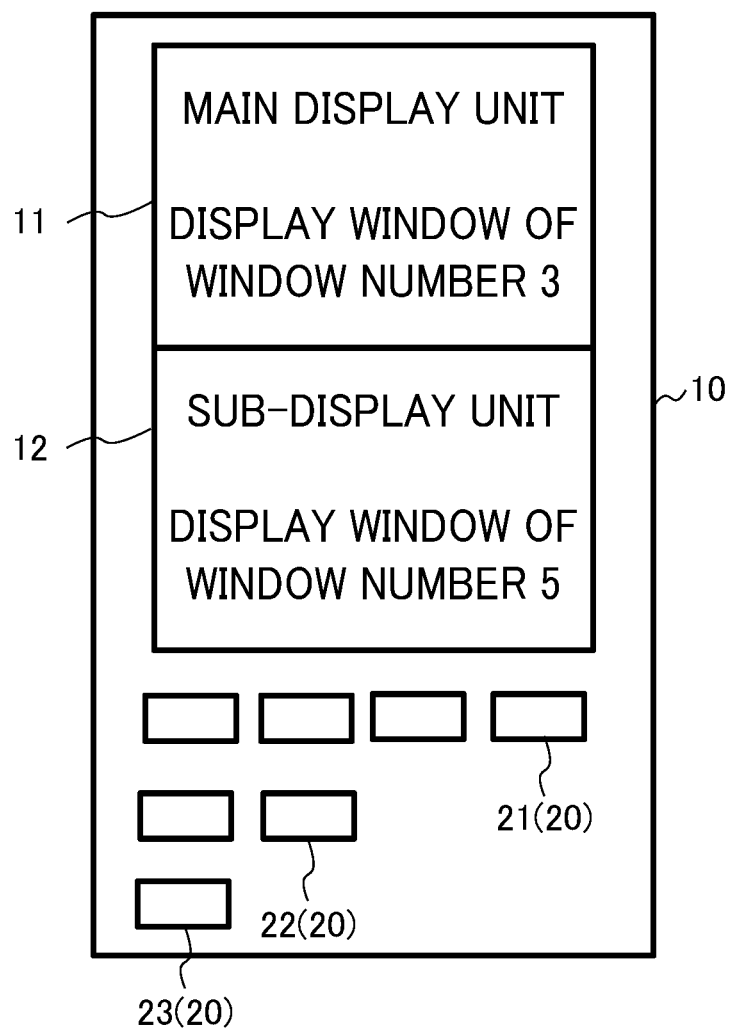
FIG. 13 is a conceptual diagram illustrating a display mode of a display device of an injection molding machine according to a modification of the present invention.

Moreover, in the respective embodiments, when the main display unit 11 and the sub-display unit 12 are configured using one display screen, the input unit 20 may have an exchanging unit 23 that exchanges the positions of the main display unit 11 and the sub-display unit 12. As illustrated in FIGS. 11 and 12, for example, the input unit 20 may have the selection input unit 21, the switching unit 22, and the exchanging unit 23.

Moreover, in the above-described embodiments, although the display device 1 of the injection molding machine 100 includes the display program storage unit 30 and the display content storage unit 40, there is no limitation thereto. For example, the display device 1 of the injection molding machine 100 may be configured to acquire and transmit the display program and the data arranged in the selection order from an external server or the like.

EXPLANATION OF REFERENCE NUMERALS

1: Display device
2: Display system
10: Display unit
11: Main display unit
12: Sub-display unit
20: Input unit
50: Display control unit
60: Counting unit
70: Operating state determination unit
100: Injection molding machine
200: Management device
201: Window selection unit
M: Operator

What is claimed is:

1. A display device of an injection molding machine, capable of displaying two or more windows, comprising:
a display having at least a main display and a sub-display;
an input device that receives an input related to selection of a window to be displayed on the display;
a processor that,
stores a selection order that indicates an order in which windows have been selected for displaying on the main display, and
selectively controls the window to be displayed on the display based on the input to the input device; and
a counting unit that counts a number of selection times of a window selected to be displayed on the main display subsequently to a window being displayed on the main display, wherein
the processor switches the window to be displayed by,
determining a first window that is displayed on the main display,
determining, based on the selection order, a second window for which the number of selection times of displaying the second window on the main display subsequently to displaying the first window on the main display is the largest among the windows, and
displaying the second window on the sub-display.

2. The display device of the injection molding machine according to claim 1, wherein
the input device receives a switching input for switching a window to be displayed on the sub-display, and
the processor switches a window to be displayed on the sub-display based on the switching input to the input device.

3. The display device of the injection molding machine according to claim 1, wherein:
the counting unit counts the number of display times of a window on the main display, and
the processor displays a window of which the number of display times counted by the counting unit is the largest on the sub-display.

4. The display device of the injection molding machine according to claim 3, wherein
the processor performs control so that a window of which the number of display times counted by the counting unit is equal to or larger than a predetermined number of times can be displayed on the sub-display.

5. The display device of the injection molding machine according to claim 3, wherein
the input device acquires identification information for identifying an operator who operates the injection molding machine, and
the processor controls a window to be displayed on the sub-display depending on an operator identified by the identification information.

6. The display device of the injection molding machine according to claim 3, further comprising:
an operating state determination unit that determines an operating state of the injection molding machine, wherein
the counting unit counts the number of display times of a window on the main display for each of the operating states, and
the processor switches a window to be displayed on the sub-display depending on the operating state.

7. A display system comprising:
a plurality of the display devices according to claim 1; and
a management device connected to the plurality of display devices, wherein
the management device includes:
a processor that selects a window to be displayed on the sub-display of each of the display devices based on a window displayed on the main display of each of the plurality of display devices, and
the processor of each the plurality of display devices displays the selected window on the display device.

* * * * *